US008796935B2

(12) United States Patent
Ferren

(10) Patent No.: US 8,796,935 B2
(45) Date of Patent: Aug. 5, 2014

(54) METHOD OF REGULATING BLUE LIGHTING IN COMMAND CENTERS

(75) Inventor: Bran Ferren, Beverly Hills, CA (US)

(73) Assignee: Applied Minds, LLC, Glendale, CA (US)

(*) Notice: Subject to any disclaimer, the term of this patent is extended or adjusted under 35 U.S.C. 154(b) by 322 days.

(21) Appl. No.: 13/278,956

(22) Filed: Oct. 21, 2011

(65) Prior Publication Data
US 2013/0099674 A1 Apr. 25, 2013

(51) Int. Cl.
H05B 39/04 (2006.01)
H05B 41/36 (2006.01)

(52) U.S. Cl.
USPC .......................................... 315/152; 315/299

(58) Field of Classification Search
USPC ................. 315/291, 297, 152, 224, 307, 299; 702/1, 4, 32
See application file for complete search history.

(56) References Cited

U.S. PATENT DOCUMENTS 7,045,974 B2 * 5/2006 Lin et al. ........................ 315/308
7,825,602 B2 * 11/2010 Hu et al. ........................ 315/152

* cited by examiner

Primary Examiner — Minh D A
(74) Attorney, Agent, or Firm — Michael A. Glenn; Perkins Coie LLP

(57) ABSTRACT

Systems and methods for gathering data relating to time, personnel tasks, personnel awareness levels, and lighting and regulating the levels of white light or blue light in a command center to optimize personnel awareness, accuracy, and effectiveness. Systems and methods for optimum delivery of blue light for ambient, display and task or spot illumination via specialized fixtures, timing, and regulation to optimize alertness and efficiency in a 24-hour command center setting.

21 Claims, 5 Drawing Sheets

METHOD OF REGULATING BLUE LIGHTING IN COMMAND CENTERS

BACKGROUND OF THE INVENTION

1. Technical Field

The invention relates to lighting control in command centers. More particularly, the invention relates to automatically setting levels and frequencies of ambient, display and work lighting for optimum operator awareness and performance.

2. Description of the Prior Art

Lighting has long been known to have a psychological and physiological effect, especially where in an interior workplace without natural light. A special challenge is maintaining alertness during night shifts in workplaces that operate around the clock, most critically in important security-related installations such as military command centers.

A command center consists of a multiuser space with individual and group work areas. Elements of a command center typically include individual workstations in an organized layout, room displays visible to multiple workers, and meeting or conference areas.

Often the center must operate for long periods of time or even continuously, mandating extended and/or multiple shifts. With the often critical nature of activities conducted from such centers, such as emergency services, military operations, or satellite communications, it is a priority to maintain a high level of awareness among the operators working there.

Several studies have been conducted comparing the frequency of light to alertness, and generally have found that shortwave light at the blue end of the visible spectrum maintains alertness more than white light or longer-wave (red) light. A study from Harvard Medical School and Brigham and Women's Hospital (Sleep, February 2006) found subjects exposed to 460 nm (blue) light rated themselves more awake and had quicker reaction times than subjects exposed to green light (555 nm) even though the visual system is more sensitive to the latter. These researchers and others found evidence of a photoreceptor system used for non-sight purposes, such as synchronizing to a 24-hour day, which continues to function even in some blind people.

It would be useful to advantageously use the properties of blue lighting to increase operator effectiveness in an operations or command center setting.

SUMMARY OF THE INVENTION

In some embodiments of the invention, systems and methods are provided for gathering data relating to time, personnel tasks, personnel awareness levels, and lighting and regulating the levels of white light or blue light in a command center to optimize personnel awareness, accuracy, and effectiveness.

In some embodiments of the invention, systems and methods provided for optimum delivery of blue light for ambient, display and task or spot illumination via specialized fixtures, timing, and regulation to optimize alertness and efficiency in a 24-hour command center setting.

In some embodiments of the invention, a command center is designed with lighting systems having white and blue light components strategically placed for use with a system that optimizes white and blue light levels for various command center regions including, but not limited to overhead lighting, workstation lighting, and display lighting.

Some embodiments of the invention involve a control system comprising a central blue light regulator engine and a plurality of processing sub-modules for gather temporal information, task-related information, awareness level information and light level information and processing the gathered information to deliver lighting signals to a plurality of lights located in a command center.

Some embodiments of the invention involve methods of regulating white and blue light levels by gathering temporal information, task-related information, awareness level information and light level information, processing the gathered information, and delivering lighting signals to a plurality of lights located in a command center.

DETAILED DESCRIPTION OF THE INVENTION

In the presently preferred embodiments, lighting fixtures emitting blue light are placed within a working environment and regulated to provide both general and task or individual workstation illumination. For the purpose of this disclosure, the term "blue light" shall mean an electromagnetic frequency in the range of 420-490 nm wavelength, within the visible range.

In some embodiments of the invention, a workspace is configured with a plurality of blue lights, as well as white lights, to take advantage of the benefits of blue light on humans. In some embodiments of the invention, additional light fixtures emitting white light, and are used to balance the level of blue light while maintaining adequate intensity for workspaces.

The presently preferred embodiments of the invention involve adjusting the levels of light in a command center. However, it will be clear to those with ordinary skill in the art having the benefit of this disclosure, that the lighting systems and methods of monitoring and controlling lighting systems are equally applicable in a wide variety of workspaces.

Figure 1:
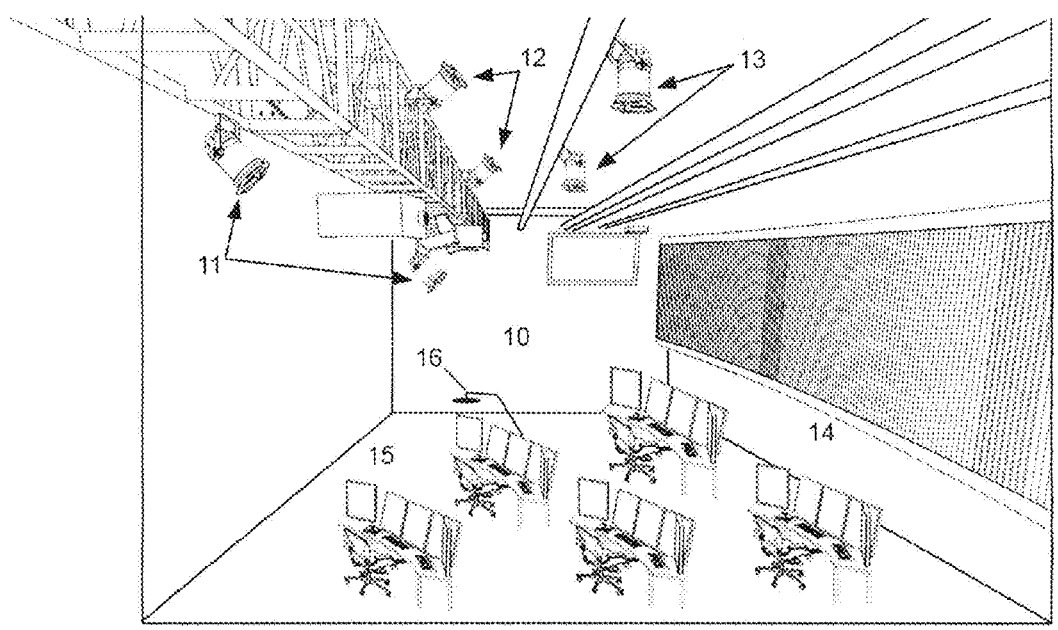
FIG. 1 illustrates an exemplary blue light installation in a workspace according to some embodiments of the invention.

FIG. 1 illustrates an exemplary blue light installation in a command center 10 according to some embodiments of the invention. The command center 10 of FIG. 1 comprises a plurality of lighting fixtures, roughly divided into three different types.

First, area lighting fixtures 11, 12, and 13 are located on the ceiling and provide background illumination for the entire space. Additional ceiling-mounted lights (not shown) may provide higher levels of illumination for specified areas, such as meeting areas or stairs. The command center 10 of FIG. 1 includes a plurality of work stations 15. Accordingly, task lighting 16 is generally affixed to one or more workstation or directly overhead, and provides tightly focused light for desks or work benches. The command center 10 of FIG. 1 also includes a large display 14, and blue light fixtures 17 are configured on the periphery of the display 14 to soften the contrast between the screen illumination and the adjacent wall, as well as to reduce eye strain.

Some embodiments of the invention involve unique methods of installing and operating the fixtures to optimize their effects, either generally or for one or more specific purposes. For example, some embodiments of the invention involve regulating the blue light in a worker's environment. The blue lighting is regulated to help maintain a desired level of awareness for personnel working in the space. Regulation may adjust the intensity of blue light based on time, area, amount of blue light received, awareness, or other variables.

Regulation by Time

Studies show sensitivity to blue light is stronger in the morning, when its effectiveness at increasing alertness is most apparent. Some embodiments of the invention involve methods of regulating blue light intensity based on a number of factors.

In some examples, the intensity of the background blue light may be varied according to time of day, or other temporal variable. For example the most intense blue light may be used in the morning and lessened in the afternoon, e.g. by desaturating with white light. For an overnight shift, the blue light might be minimized in the early evening when workers are most alert, and increased as the night goes on to help prevent the urge of sleep. In other examples, an initial high level of blue light can be programmed when a shift starts in order to boost melatonin, and thus awareness.

Often, command centers are conducting or monitoring operations in another time zone. For example, a military center in the US in the middle of the night could be operating drones over the Middle East in broad daylight. Accordingly, a disconnect between the time zones can lead to fatigue and disorientation. To lessen this effect, light levels may be adjusted to conform to the time zone the operators are concerned with, which is not necessarily the same as their physical location. In some embodiments of the invention, a processing module is configured for automatically accounting for time zone differences and daylight savings time adjustments (explained in greater detail below).

Regulation by Task

A large proportion of blue lighting takes some adaptation, especially when coming from another room with bright white light, or from daylight. For personnel who must frequently exit and enter their workspace from such areas, local lighting should be brighter and have a higher proportion of white light than personnel who remain in the blue-lit room for long periods of time.

Accordingly, some embodiments of the invention involve regulating the intensity of blue light depending on the frequency of use of the area by one or more group of personnel. For example, this can be easily accomplished through configuration of areas of overhead lighting in high traffic areas with less of a blue light component for groups of workers routinely entering the area from daylight and separate, workstation-specific lighting, such as desk lights with relatively more blue light, for individuals remaining in a command center for more extended periods of time. In some other embodiments, a processing module gathers information about the entering and exiting habits of personnel and automatically adjusts blue light to optimize utility.

A corridor may be used as a transition between the blue-lit environment and an outside or white-lit area. The lighting color may vary along the length of the corridor, with the balance changing from blue to white to match the environments at either end. The gradual change prevents an abrupt change in lighting and can reduce stress and disorientation.

In some embodiments of the invention, information relating to time-spent at a workstation is gathered by personnel notifying the system via an identifier in a badge or login information, such as a personal identification number (PIN) or password. For example, when a particular personnel member logs into their workstation computer, he will be required to enter a PIN or scan a badge for identification. The system may then compare the identification with stored information on what type of task the user or job position normally performs, specifically whether the task is stationary or involves frequent movement around the workspace. For those workers identified as kinetic, i.e. frequent movers, less blue light is needed. Similarly, for those workers identified as stationary, more blue light is optimal. In some other embodiments, workers self-report their work style manually or adjust a work style interpreted via their badge or PIN.

In some other embodiments, movement may be tracked via sensors at various points, such as entry doors, configured to detect personnel badges. Movement patterns may be tracked over time and used to build up predominant patterns, which can then be used to set optimal blue lighting levels.

Although specific methods of gathering task-related information are disclosed, those with ordinary skill in the art having the benefit of this disclosure will understand that various methods, now known or later developed, are equally appropriate for gathering information about worker's task as they affect blue light optimization.

Regulation by Awareness Level

Some embodiments of the invention involve regulating workstation lighting based on gathered biometrics or other quantifiable human attribute. For example, in some embodiments of the invention, lighting of individual work spaces, such as narrowly focused overhead lighting or workstation lighting, is regulated by monitoring the worker's awareness level.

Several of these technologies have been studied as a means of tracking awareness and fatigue. In some embodiments of the invention, when fatigue is detected, lighting intensity is increased to stimulate melatonin, and thus awareness.

According to the presently preferred embodiments of the invention, monitoring may be done through a variety of means, including, but not limited to blink rate sensors, nodding sensors, and typing accuracy.

Fatigued individuals tend to blink more. Accordingly, in some embodiments of the invention, the blink rate of workplace personnel is monitored and blue light levels are automatically adjusted by a processing module to combat fatigue. The blue light adjustment is based on the monitored blink rate and an equation stored in memory connected with the processing module. In the presently preferred embodiments of the invention, personnel blink rate is detected and monitored through a high frame rate camera pointed at a person's face.

In some other embodiments, an individual is monitored for nodding or other physical indicia of tiredness and blue light levels are automatically adjusted by a processing module to combat fatigue. The blue light adjustment is based on the monitored nodding and an equation stored in memory connected with the processing module. In the presently preferred embodiments of the invention, personnel nodding are monitored by a nodding sensor comprising a camera or a commercially available over-ear device, such that nodding movements when a person is falling asleep can be detected.

Typing accuracy is another indicia of alertness. Accordingly, in some other embodiments, an individual is monitored for typing accuracy. Measurements of how often a worker goes back and alters a word, or makes apparent spelling or grammar mistakes, can be used additional or alternate indicators of tiredness. Accordingly, blue light levels are automatically adjusted by a processing module to combat fatigue when typing inaccuracy indicates fatigue.

Regulation by Amount of Light Received

In certain situations it may be advantageous to measure the current and cumulative amount of the light at a given area of the command center. Accordingly, some embodiments of the invention involve regulating workstation lighting based on the cumulative amount of the light at a given area of the command center.

In the presently preferred embodiments of the invention, photoelectric light sensors are placed at workstations and other areas to gather lighting attributes. In some embodiments of the invention, filters are placed over the sensors to measure only the blue light and/or the proportion of blue light to other frequencies. The gathered lighting data is used by a control system (explained in greater detail below) to adjust the percentage of blue light verses white light in a certain area.

Control System

The presently preferred embodiments of the invention involve a lighting control system configured for regulating blue light in a command center.

Figure 2:
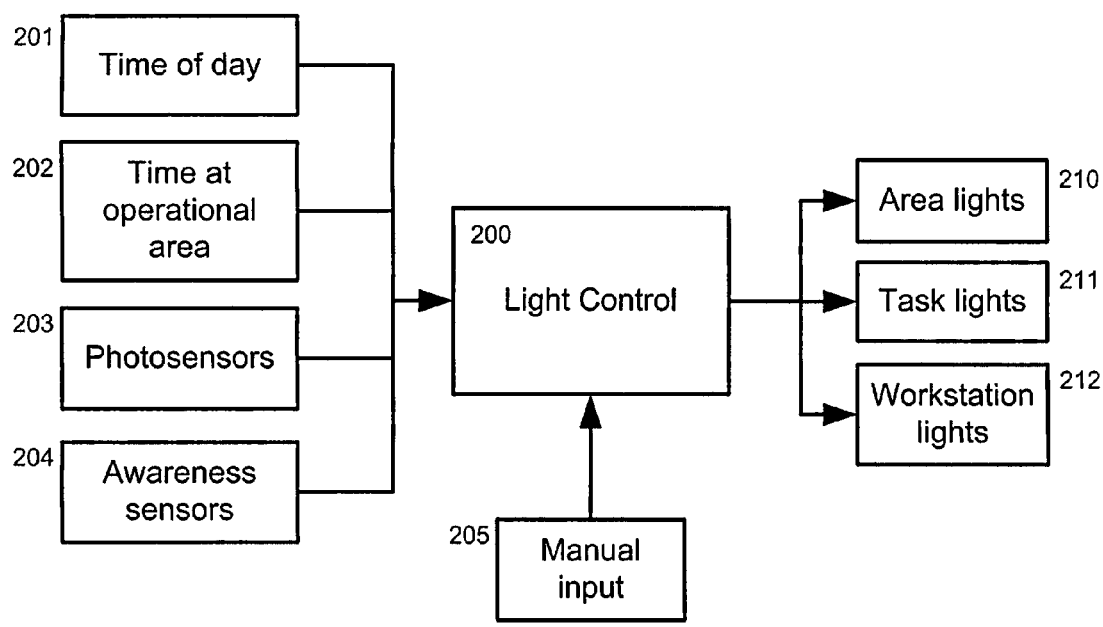
FIG. 2 illustrates a lighting control system according to some embodiments of the invention.

FIG. 2 illustrates a lighting control system according to some embodiments of the invention. According to FIG. 2, the lighting control system 200 includes one or more busses for accepting inputs, a processor operatively coupled with a memory device, wherein processor is configured for processing input, and one or more controllers for outputting processed instructions to one or more lighting group. As shown, the lighting control system accepts inputs including: input of local time 201, input of local time in the time zone of remote operations run from the command center 202, measurements of light output and proportion of blue light obtained from photosensors 203, and inputs awareness sensors 204. Also, shown is a manual input 205. In some embodiments, additional inputs may be manually entered and adjusted, for example to define shift lengths overall or by specific area, direct setting of light levels, or modes such as for regular vs. emergency operations vs. tours.

The control system 200 is coupled with a plurality of lighting systems including area lights 210, task lights 211, and workstation lights 212. The control system 200 is configured to adjust and monitor the output from each individual fixture, both for the space as a whole and for task lighting.

In some embodiments of the invention, the control system 200 is based on digital communication standards, such as the DMX-512 serial protocol, used for lighting control systems. These systems typically consist of a lighting controller accepting inputs from a touchscreen or button station, and outputting commands to a dimmer from which lights are powered.

Figure 3:
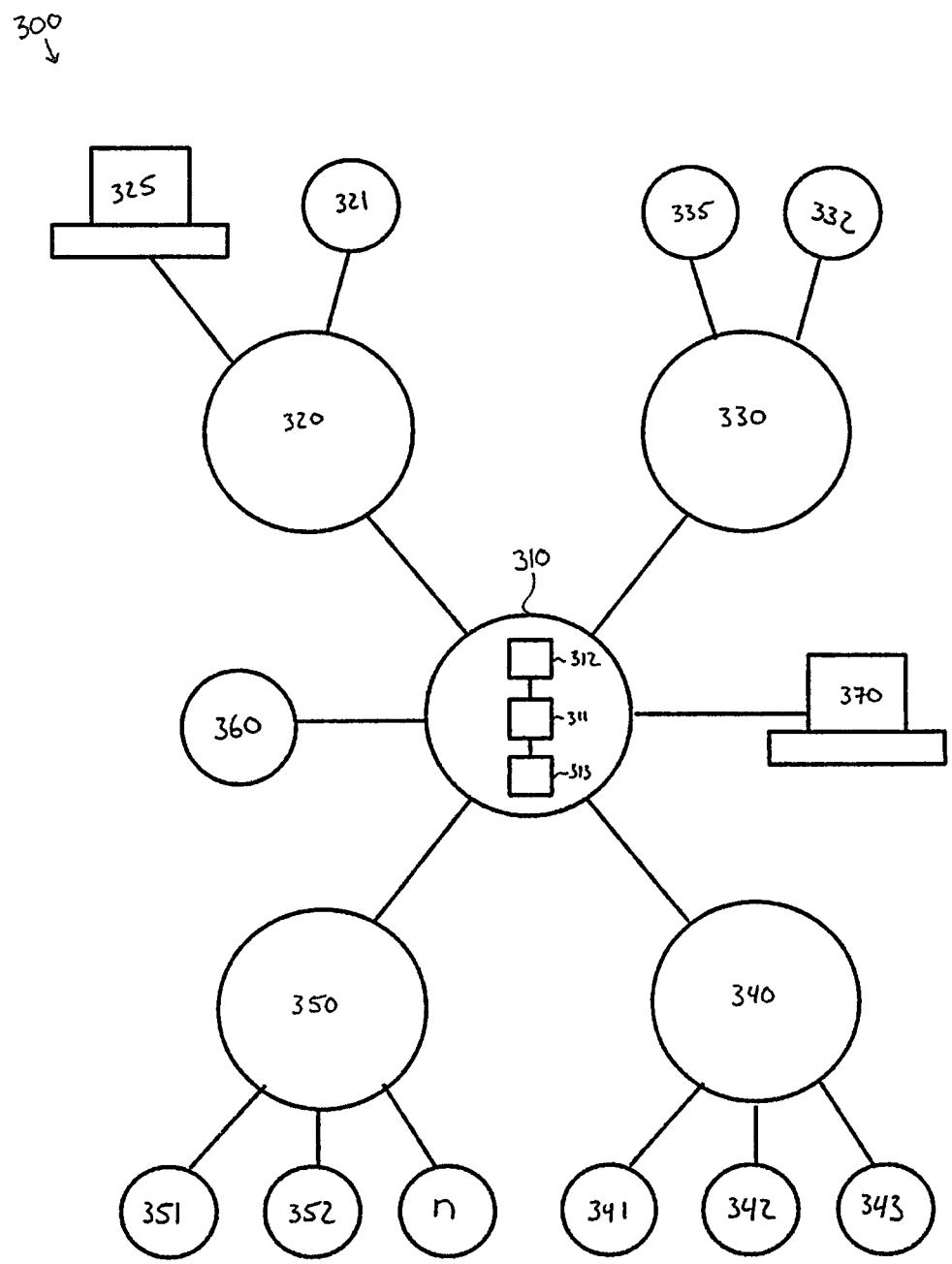
FIG. 3 illustrates a control system's processing modules according to some embodiments of the invention.

FIG. 3 illustrates a control system 300 represented in modular form according to some embodiments of the invention. The control system 300 comprises a central blue light regulator engine 310 containing a processor 311, a memory 312, and one or more connectors 313 for operatively coupling the central blue light regulator engine 310 with a plurality of processing sub-modules 320, 330, 340, 350, and 360.

As used herein, the terms "module" and "sub-module" refer to any software and/or hardware processing component or portion thereof that may be used to implement one or more of the processing functions.

In the presently preferred embodiments of the invention, the plurality of processing sub-modules 320, 330, 340, and 350 are configured for gathering lighting attributes. In some embodiments, the central blue light regulator engine 310 is preprogrammed with one or more algorithm configured to automatically optimize lighting settings according to the gathered attributes. In some other embodiments, the central blue light regulator engine 310 is coupled with one or more operator computer 370 for allowing an operator to manually enter custom optimization settings.

In some embodiments, the central blue light regulator engine 310 is operatively coupled with a time regulator 320 sub-module. The time regulator 320 is configured to process time-based inputs and output instructions for controlling the white lights and blue lights of a lighting system. In some embodiments of the invention, the time regulator 320 is operatively coupled with one or more user computer 325. Operators can manually enter time-related lighting instructions into the user computer 325 for ingestion by the time regulator 320. Additionally, the time regulator 320 can be configured with instructions for automatically processing computer records on the one or more user computer.

For example, in some embodiments of the invention, the time regulator 320 is configured for automatically accessing personnel schedules and for determining optimal times for exposing personnel to blue light, varying blue and white light intensity based on personnel start time and end time, and performing other lighting adjustments to optimize awareness and alertness.

In some embodiments of the invention, the time regulator 320 is operatively coupled with one or more clock 321. In the presently preferred embodiments of the invention, the clock 321 comprises a world clock with a plurality time values for various time zones and adjusted for daylight saving time. According to these embodiments, lighting exposure, duration, etc. is individually optimized for personnel based on their time zone.

For example, soldiers in Arizona and soldiers in Hawaii may be collaborating to target an object in Afghanistan during daylight saving time and both the Arizona command center and the Hawaiian command center are networked with the time regulator 320. The time regulator 320 references the clock 321 which returns the current time in Mountain Standard Time (Arizona does not adjust for daylight saving time), Hawaii Daylight Time, and perhaps Afghanistan time. The time regulator 320 determines optimal blue light levels for personnel based on local time.

As explained above, it takes more time for human eyes to adjust to blue light when coming indoors from daylight. In some embodiments, the time regulator 320 determines the current outside light levels based on the local time of day, as well as on the sun's position in the sky and the time regulator 320 configures light levels accordingly. These embodiments are particularly useful in areas having wide swings in daylight duration.

Although specific examples of temporal-based lighting considerations are listed, a plurality of other temporal-based considerations will be readily apparent to those with ordinary skill in the art having the benefit of this disclosure.

In some embodiments of the invention, the central blue light regulator engine 310 is also operatively coupled with a task regulator 330 sub-module. The task regulator 330 is configured to process task related information and output instructions for controlling the white lights and blue lights of a lighting system.

In some embodiments of the invention, the task regulator 330 is operatively coupled with one or more user computer 335. Operators can self-report task related information by manually enter task-related lighting instructions into the user computer 335 for ingestion by the task regulator 330.

As explained above, for personnel who must frequently exit and enter their workspace from such areas, local lighting should be brighter and have a higher proportion of white light than personnel who remain in the blue-lit room for long periods of time. Accordingly, the command center can be outfitted with motion sensors to capture traffic flow data and a task regulator 330 for automatically processing lighting instructions for optimizing task lighting based on traffic.

Additionally, in some embodiments of the invention, the task regulator 330 is coupled with a processing sub-module 332 configured for monitoring personnel CPU usage. According to these embodiments, the task regulator 330 can determine to adjust blue light based on time spent at a workstation.

Although specific examples of task-related lighting considerations are listed, a plurality of other task-related considerations will be readily apparent to those with ordinary skill in the art having the benefit of this disclosure.

In some embodiments of the invention, the central blue light regulator engine 310 is also operatively coupled with an awareness regulator 340 sub-module. The awareness regulator 340 comprising a processing module operatively coupled to one or more sensor for monitoring personnel awareness or fatigue levels. The awareness regulator 340 is further configured for outputting lighting instructions based on gathered biometrics or other gathered indicia of fatigue.

In some embodiments of the invention, the awareness regulator 340 is operatively coupled with one or more blink sensor 341, one or more nodding sensor 342, and one or more typing accuracy module 343. According to these embodiment personnel are monitored for blinking, nodding, sloppy typing or other physical indicia of tiredness and instructions are passed by the awareness regulator 340 to the central blue light regulator engine 310. Preferably, blue light levels are automatically adjusted by the central blue light regulator engine 310 to combat fatigue based on the gathered biometrics and other gathered indicia of fatigue.

Although specific examples of awareness level gathering types are listed, a plurality of other biometrics and other indicia of fatigue are readily applicable to the invention, as will be readily apparent to those with ordinary skill in the art having the benefit of this disclosure.

In some embodiments of the invention, the central blue light regulator engine 310 is also operatively coupled with one or more photosensor regulator 350 sub-module. Preferably, the photosensor regulator 350 is operatively coupled with a plurality of photosensors 351, 352, . . . n located in various strategic positions around a control center. The photosensors 351, 352, . . . n gather white light information and blue light information and report the gathered information back to the photosensor regulator 350. Accordingly, the photosensor regulator 350 processes the gathered information and outputs instructions to the central blue light regulator engine 310. Of course, other configurations of photosensors will be readily apparent to those with ordinary skill in the art having the benefit of this disclosure.

In the presently preferred embodiments of the invention, the central blue light regulator engine 310 gathers the individual instructions from the various sub-modules, optionally assigns a weight to, each, processes the instructions based on pre-configured instructions or based on an operator's preferences, or both, and delivers operation signals to a controller 360 for controlling the light setting for the in the command center.

Figure 4:
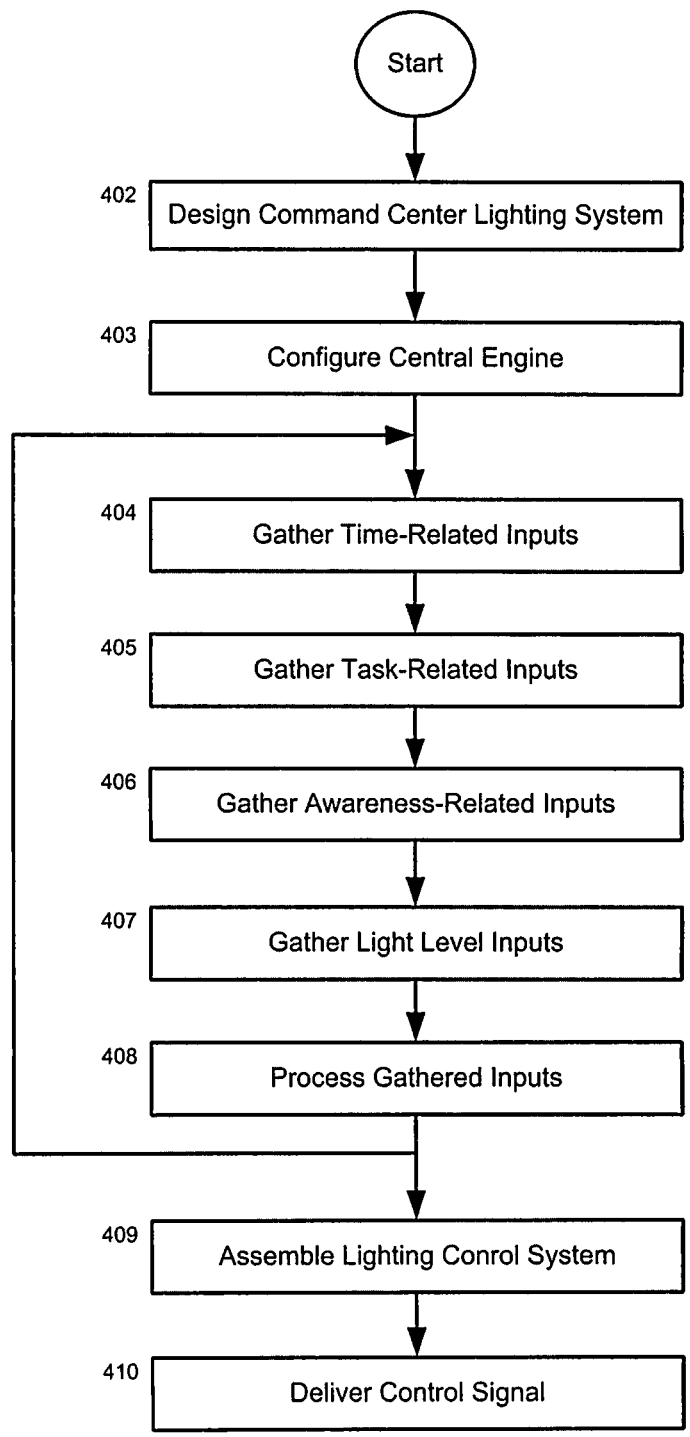
FIG. 4 illustrates a method for placing lighting, configuring a central light regulator engine, gathering lighting attributes, and optimizing lighting in a command center according to some embodiments of the invention.

FIG. 4 illustrates a method 400 for placing lighting, configuring a central light regulator engine, gathering lighting attributes, and optimizing lighting in a command center according to some embodiments of the invention.

The method 400 starts 401 by designing a command center lighting system 402 with a plurality of white lights and blue lights. Designing a command center lighting system 402 preferably involves taking into account the need for general purpose lighting, task-related specific lighting, workstation lighting, and display lighting.

Next, the method 400 involves configuring a central blue light regulator engine 403. In some embodiments, the step of configuring a central blue light regulator engine 403 involves designing a purpose built processing algorithm embedded in hardware especially designed to optimize white and blue lighting according to programmed logic. In some other embodiments, the step of configuring a central blue light regulator engine 402 involves using a graphical user interface for recording customized instructions from an operator defining white and blue lighting optimization preferences. In some other embodiments, the step of configuring a central blue light regulator engine 403 involves a hybrid process involving both custom preferences and automatic logic.

Next, the method 400 performs a series of steps of gathering command center-related values including: gathering time-related inputs 404; gathering task-related inputs 405; gathering awareness-related inputs 406; and gathering light level inputs 407. Preferably, the series of steps of gathering command center-related values are performed using a system architecture described above in relation to FIG. 3.

The method 400 continues with processing the gathered values in the central blue light regulator engine 408 according to the configuration step 403. Preferably, the method 400 is continuous in that the step of processing the gathered values in the central blue light regulator engine 408 is constantly being performed as new values are input. Additionally, the processed values are assembled into a lighting control signal 409 and the control signal is delivered 410 to the plurality of white lights and blue lights.

Figure 5:
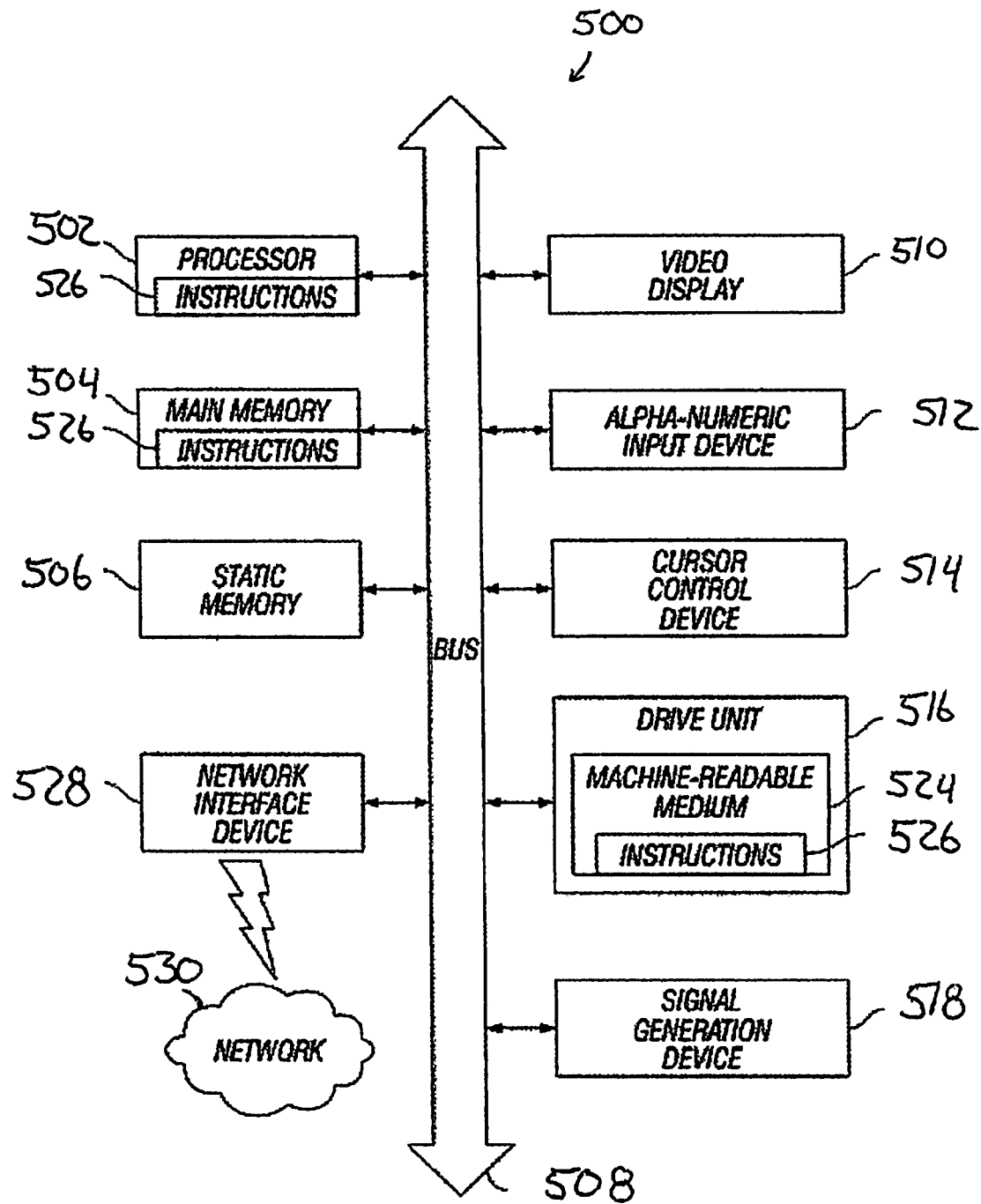
FIG. 5 is a block schematic diagram of a machine in the exemplary form of a computer system within which a set of instructions may be programmed to cause the machine to execute the logic steps of the invention.

FIG. 5 is a block schematic diagram of a machine in the exemplary form of a computer system within which a set of instructions may be programmed to cause the machine to execute the logic steps of the invention.

FIG. 5 is a block schematic diagram of a machine in the exemplary form of a computer system 500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a display unit 510, for example, a liquid crystal display (LCD) or a cathode ray tube (CRT). The computer system 500 also includes an alphanumeric input device 512, for example, a keyboard; a cursor control device 514, for example, a mouse; a disk drive unit 516, a signal generation device 518, for example, a speaker, and a network interface device 520.

The disk drive unit 516 includes a machine-readable medium 524 on which is stored a set of executable instructions, i.e. software, 526 embodying any one, or all, of the methodologies described herein below. The software 526 is also shown to reside, completely or at least partially, within the main memory 504 and/or within the processor 502. The software 526 may further be transmitted or received over a network 528, 530 by means of a network interface device 520.

In contrast to the system 500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention described herein with reference to the preferred embodiments, one skilled in the art will readily appreciate that other applications may be substituted for those set forth herein without departing from the spirit and scope of the invention. Accordingly, the invention should only be limited by the Claims included below.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A lighting system comprising:
    a plurality of lights placed within a working environment configured for illuminating said working environment with both white light and blue light;
    a processing module, comprising a processor operatively coupled with a memory;
    a plurality of sub-modules operatively coupled with said processing module and configured for gathering data related to the lighting needs of said working environment and for communicating said data to said processing module;
    wherein said sub-modules comprise at least one of:
        a time regulator module configured for at least one of gathering shift times for personnel or gathering local times of remote areas monitored by personnel;
        a task regulator module configured for gathering data on movement of personnel into and out of said working environment;
        an awareness regulator module configured for gathering data from one or more alertness sensors; and
        a photosensor regulator module configured for gathering data from one or more photosensors positioned within said working environment;
    wherein said processor is configured for receiving data gathered from sub-modules, forming one or more lighting control signals based on one or more stored lighting optimization instructions, and transmitting said lighting control signals to vary the intensity of at least one light from among said plurality of said lights.

2. The lighting system of claim 1, wherein said plurality of lights further comprises:
    general lighting configured to illuminate a large area within said working environment; and
    task lighting configured to illuminate a particular area within said working environment.

3. The lighting system of claim 1, wherein said plurality of lights further comprises display area lighting configured for emitting softening light around the periphery of a display.

4. The lighting system of claim 1, wherein said processing module receives said shift times from said time regulator module, and includes a lighting optimization instruction configured for forming a lighting control signal to deliver higher levels of blue light to one or more said lights at specified times during a shift.

5. The lighting system of claim 1, wherein said processing module receives from said time regulator module said local times of remote areas monitored by personnel, and includes a lighting optimization instruction configured for forming a lighting control signal to deliver varying levels of blue light to one or more said lights based on said local times.

6. The lighting system of claim 5, wherein task-related data is gathered by identification of personnel by means of personal electronic badges and a badge reader, and correlation of said personnel with stored information on task assignments and movement requirements.

7. The lighting system of claim 5, wherein task-related data is gathered by login information, and correlated with stored information on task assignments and movement requirements.

8. The lighting system of claim 5, wherein task-related data is gathered by tracking movement of personnel by means of sensors configured to detect personnel badges.

9. The lighting system of claim 5, wherein said processing module includes a lighting optimization instruction configured for forming a lighting control signal to deliver a greater amount of blue light to work stations associated with personnel spending a relatively high proportion of time at said work station, and a lesser amount of blue light to areas in said working environment associated with personnel spending a relatively high proportion of time moving throughout said working environment or in and out of said working environment.

10. The lighting system of claim 1, said task regulator module configured for gathering task-related data relating to the proportion of time personnel members spend at a specific work station within the work environment, away from said specific work station, and frequency and duration of movement in and out of said working environment.

11. The lighting system of claim 1, wherein said awareness regulator module transmits personnel awareness data to said processing module, wherein said processing module includes a lighting optimization instruction configured for forming a lighting control signal to vary an amount of blue light in one or more lights of said plurality of lights based on one or more indicia of alertness.

12. The lighting system of claim 1, wherein said alertness sensors comprise at least one of:
    an eye tracking sensor configured for monitoring personnel blinking habits and for correlating frequency of eyelid closing as an indication of non-alertness;

a head nodding sensor configured for monitoring personnel head nodding habits and for correlating frequency of nodding as an indication of non-alertness; and a typing accuracy sensor configured for monitoring task accuracy of personnel and for correlating frequency of typing errors as an indication of non-alertness.

13. The lighting system of claim 1, wherein said photosensor regulator module transmits light level data to said processing module, wherein said processing module includes a lighting optimization instruction configured for forming a lighting control signal to vary an amount of blue light in one or more lights of said plurality of lights based on feedback from said one or more photosensors.

14. The lighting system of claim 1, further comprising an administrative computer operatively coupled with said processing module, wherein said administrative computer provides access to an operator for performing one or more of:
   selecting one or more default, automatic lighting optimization instruction;
   inputting one or more custom lighting optimization instruction; and
   adjusting one or more lighting optimization instruction.

15. The method of claim 14, wherein the step of gathering time-related inputs from a time-related sub-module further comprises:
   accessing a clock configured for providing time information based on world time zones and accounting for daylight saving time; and
   wherein the step of assembling a control signal further comprises forming a lighting control signal to deliver varying levels of blue light to one or more light in said plurality of lights based on either the time in the working environment or the time in a remote area monitored by personnel in said working environment.

16. The method of claim 15, wherein the step of detecting one or more indicia of alertness comprises one or more of:
   monitoring personnel blinking habits with an eye tracking sensor and correlating closing eyelids more often as an indication of non-alertness;
   monitoring personnel head nodding habits with a head nodding sensor and correlating nodding more often as an indication of non-alertness; and
   monitoring task accuracy of personnel with a typing accuracy and correlating frequency of typing errors as an indication of non-alertness.

17. The method of claim 14, wherein the step of gathering time-related inputs from a time-related sub-module further comprises:
   gathering shift start-end time data of one or more personnel member by either automatically accessing personnel schedule information from said one or more computer, manually accepting shift start-end time data from said one or more personnel member, or a combination of automatically accessing personnel schedule information from said one or more computer and manually accepting shift start-end time data from said one or more personnel member; and
   wherein the step of assembling a control signal further comprises forming a control signal to deliver higher levels of blue light to one or more light in said plurality of lights at the start time of a shift based on the shift start-end time data gathered by said time regulator module.

18. The method of claim 14, wherein said step of gathering awareness-related inputs from an awareness module further comprising:

detecting, with one or more sensors within said working environment, one or more indicia of alertness; and
wherein the step of assembling a control signal further comprises forming a lighting control signal to vary an amount of blue light in one or more lights of said plurality of lights based on said one or more indicia of alertness.

19. The lighting system of claim 1, further comprising a transitional corridor between a blue-lit environment and an outside or white-lit area, comprising a gradual change in color balance between blue and white light.

20. A method of optimizing blue light in a work space comprising:
   installing a plurality of lights having a white light component and a blue light component in a working area;
   configuring a central processing engine for varying the intensity of one or more lights in said plurality lights based on one or more lighting optimization instruction;
   coupling a plurality of sub-modules with said central processing engine, wherein said sub-modules are configured for gathering data related to the blue lighting needs of working environment and configured for communicating said gathered data to the central processing engine;
   gathering time-related inputs from a time-related sub-module;
   gathering task-related inputs from a task-related sub-module;
   gathering awareness-related inputs from an awareness module;
   gathering light level inputs from a photosensor module;
   delivering gathered inputs to said central processing engine;
   assembling, by said central processing engine, a control signal using the gathered inputs according to one or more lighting optimization instruction;
   delivering said lighting control signal to at least a subset of said plurality of lights; and controlling the blue light levels of said subset of said plurality of lights.

21. A lighting system comprising:
   a plurality of lights placed within a working environment configured for illuminating said working environment with both white light and blue light said plurality of lights further comprising:
      general lighting configured to illuminate a large area within said working environment;
      task lighting configured to illuminate a particular area within said working environment; and
      display area lighting configured for emitting softening light around the periphery of a display;
   a processing module, comprising a processor operatively coupled with a memory;
   a plurality of sub-modules operatively coupled with said processing module and configured for gathering data related to the lighting needs of said working environment and for communicating said data to said processing module;
   wherein said sub-modules comprise each of:
      a time regulator module configured for at least one of gathering shift times for personnel or gathering local times of remote areas monitored by personnel;
      a task regulator module configured for gathering data on movement of personnel into and out of said working environment;
      an awareness regulator module configured for gathering data from one or more alertness sensors; and a photosensor regulator module configured for gathering data from one or more photosensors positioned within said working environment;

wherein said processor is configured for receiving data gathered from sub-modules, forming one or more lighting control signals based on one or more stored lighting optimization instructions, and transmitting said lighting control signals to vary the intensity of at least one light from among said plurality of said lights.

* * * * *